(12) United States Patent
Wischmann et al.

(10) Patent No.: US 6,989,539 B2
(45) Date of Patent: Jan. 24, 2006

(54) FLAT DYNAMIC RADIATION DETECTOR

(75) Inventors: Hans-Aloys Wischmann, Aachen (DE);
Herfried Karl Wieczorek, Aachen
(DE); Falko Busse, Aachen (DE); Ralf Schmidt, Aachen (DE)

(73) Assignee: Koninklije Philips Electronics N.V., Eindhoven (NL)

( * ) Notice: Subject to any disclaimer, the term of this patent is extended or adjusted under 35 U.S.C. 154(b) by 147 days.

(21) Appl. No.: 10/189,960

(22) Filed: Jul. 8, 2002

(65) Prior Publication Data
US 2003/0020019 A1 Jan. 30, 2003

(30) Foreign Application Priority Data
Jul. 6, 2001 (DE) ................................. 101 32 924

(51) Int. Cl.
*G01T 1/24* (2006.01)
*G01T 1/20* (2006.01)
*H01J 47/02* (2006.01)

(52) U.S. Cl. .............................. 250/370.11; 250/361 R; 250/367; 250/370.08; 250/370.09; 250/374

(58) Field of Classification Search ............. 250/361 R, 250/367, 370.06, 370.09, 374, 210, 370.11, 250/370.01; 313/502; 438/65
See application file for complete search history.

(56) References Cited

U.S. PATENT DOCUMENTS

| | | | | |
|---|---|---|---|---|
| 3,594,583 | A | * | 7/1971 | Sheldon ........................ 250/210 |
| 4,945,243 | A |   | 7/1990 | Arques |
| 4,980,553 | A |   | 12/1990 | Henry |
| 5,574,284 | A | * | 11/1996 | Farr ......................... 250/370.06 |
| 5,636,299 | A | * | 6/1997 | Bueno et al. ................. 385/15 |
| 5,652,430 | A | * | 7/1997 | Lee ........................... 250/370.09 |
| 5,742,059 | A | * | 4/1998 | Hassler ...................... 250/370.09 |
| 5,848,122 | A | * | 12/1998 | Kurtz .......................... 378/80 |
| 6,087,618 | A | * | 7/2000 | Wiener-Avnear et al. .................. 219/121.6 |
| 6,194,727 | B1 | * | 2/2001 | Lee et al. .................. 250/370.09 |
| 6,326,625 | B1 | * | 12/2001 | Zur ........................... 250/370.09 |
| 6,353,228 | B1 | * | 3/2002 | Itabashi ..................... 250/370.11 |
| 6,362,484 | B1 | * | 3/2002 | Beyne et al. ................ 250/374 |
| 6,440,769 | B2 | * | 8/2002 | Peumans et al. ............. 438/65 |
| 6,510,195 | B1 | * | 1/2003 | Chappo et al. .............. 378/19 |
| 6,583,419 | B1 | * | 6/2003 | Moy et al. ................. 250/370.11 |

(Continued)

FOREIGN PATENT DOCUMENTS

DE 44 20 603 C1 6/1995

(Continued)

*Primary Examiner*—Frank G. Font
*Assistant Examiner*—Mary El-Shammaa
(74) *Attorney, Agent, or Firm*—Douglas B. McKnight

(57) ABSTRACT

The invention relates to a radiation detector for converting electromagnetic radiation (15) into electric charge carriers. The invention also relates to an X-ray examination apparatus provided with such a radiation detector, and to a method of manufacturing a radiation detector. In order to achieve a small building height of the radiation detector while nevertheless satisfying the same requirements as regards the resetting of the converter arrangement (16, 18) by means of an illumination device (6), it is proposed to provide a supporting layer (8) underneath a glass plate (2a) with a photosensor arrangement (2b), which supporting layer on the one hand provides uniform distribution of the light incident from below and on the other hand imparts the necessary stability to the radiation detector. In a further embodiment it is proposed to provide a scatter foil (14) instead of the supporting layer (8), which scatter foil provided the homogeneous light distribution while the supporting function is taken over by the illumination device.

16 Claims, 1 Drawing Sheet

U.S. PATENT DOCUMENTS

| | | | |
|---|---|---|---|
| 6,642,650 B1 * | 11/2003 | Struye et al. | 313/502 |
| 6,655,675 B2 * | 12/2003 | Rutten et al. | 250/368 |
| 6,664,071 B1 * | 12/2003 | Windhab et al. | 435/7.94 |
| 6,717,150 B2 * | 4/2004 | Hoffman | 250/370.11 |
| 6,787,778 B2 * | 9/2004 | Kobayashi et al. | 250/370.09 |
| 2001/0012330 A1 * | 8/2001 | Ogura et al. | 378/95 |
| 2002/0070343 A1 * | 6/2002 | Hoffman | 250/367 |
| 2003/0155515 A1 * | 8/2003 | Moy et al. | 250/361 R |

FOREIGN PATENT DOCUMENTS

| | | |
|---|---|---|
| DE | 199 14 217 A1 | 10/2000 |
| DE | 19914217 A1 | 10/2000 |

* cited by examiner

FLAT DYNAMIC RADIATION DETECTOR

BACKGROUND

The invention relates to a radiation detector for converting electromagnetic radiation into electric charge carriers. The invention also relates to an X-ray examination apparatus provided with radiation detector of this kind and to a method of manufacturing a radiation detector.

Radiation detectors are used notably in the medical field, that is, for X-ray examinations, and serve to form radiation images of an object to be examined, usually a patient, in the context of mostly a medical examination or therapy. An image pick-up system which also includes the X-ray detector is used to form images of the object to be examined which is exposed to the X-rays, said images being output, for example, via a monitor. The X-rays incident on the X-ray detector are converted into electric charge carriers in a converter arrangement. The electric charge carriers generated in the converter arrangement are collected in associated capacitances so as to be read out by a downstream electronic read-out circuit arrangement.

Generally speaking, a radiation detector is constructed in such a manner that the electromagnetic radiation is incident on a converter arrangement. Depending on the specific construction of the radiation detector, either a directly converting converter layer in the converter arrangement converts the radiation into electric charge carriers which are subsequently read out, or the radiation is first converted into visible light by means of two converter layers and subsequently, that is, in a second converter layer which is arranged therebelow, notably a photosensor arrangement, into electric charge carriers so as to be read out.

In the case of radiation detectors provided with a converter arrangement which includes two converter layers, the first converter layer is provided as a scintillator layer of, for example, CsI:Ti. Underneath this first converter layer, that is, viewed in the direction of the incident radiation, the second converter layer is formed as a photosensor arrangement.

The individual photosensors detect the radiation converted into visible light, said radiation then being read out one pixel after the other via the individual photosensors. The conversion of radiation directly into electric charge carriers in radiation detectors provided with a converter arrangement with only a single converter layer is also referred to as direct conversion. The first converter layer is then constructed as a directly converting semiconductor layer of, for example, amorphous selenium. Radiation detectors with direct conversion in only a single converter layer may also be realized by means of a PbO layer, the charge carriers produced then being stored and subsequently read out.

Underneath the converter layer or layers (depending on the construction of the radiation detector) there is provided an illumination device which serves to reset the individual pixels of the photosensor arrangement in the context of the preparation of the radiation detector for a further exposure. For radiation detectors which include only a single converter layer for direct conversion it is also effective to induce a charge carrier flood by way of a reset light pulse, thus exerting a positive effect on the decay behavior of the converter layer so as to enable a faster series of X-ray images and/or a better quality to be achieved without image artifacts.

The converter layers mentioned thus far are supported by a substrate of, for example, glass.

It has been found that the photosensor arrangement or second converter layer exhibits a slow decay which has an adverse effect on successive image exposures. Such a decay behavior is detrimental notably when many images are acquired per unit of time. The cause of such decay lies in physical processes which take place in the photosensors upon incidence of optical photons. When a photon is incident on the semiconductor material of the photosensor arrangement, an electron is moved from the valence band to the conduction band and the electric charge thus produced is stored on electrodes of the semiconductor layer which constitute a capacitance. However, because so-called traps occur in the semiconductor layer of the photosensor arrangement due to contaminations and grid defects, many electrons remain behind in the semiconductor layer. Normally speaking, the charge carriers present in the traps are thermally emitted in the course of time and transferred to the electrodes, be it that this may take a long period of time. Because of this quasi-thermal emission, which also takes place when the photosensor arrangement has already been read out and a second image is formed, so-called afterimages or image artifacts of the previously acquired image will be visible in subsequently acquired images.

In order to solve this problem, it is known to read out the photosensor arrangement after successful formation of an X-ray image and to make the illumination device deliver subsequently at least one light pulse which acts on the second converter layer. The light pulse floods the second converter layer with charge carriers and the traps in all pixels are uniformly occupied. In order to achieve an as effective as possible occupation of the traps by charge carriers, the illumination device emits light of a given wavelength in the form of one or more separate light pulses in rapid succession. For effective resetting, however, it is a prerequisite that the light emitted by the illumination device is uniformly distributed in the direction of the photosensor arrangement.

DE 199 14 217 describes an X-ray detector in which a scintillator arrangement is arranged over a pixel matrix, both elements being arranged over a glass support which supports the scintillator arrangement and the pixel matrix. Underneath the glass support there is provided a layer of air and the light source or illumination device is situated underneath said layer of air. This layer of air is necessary to achieve a spatial distribution of the light emitted by the illumination device and to distribute the light as homogeneously as possible. Direct arrangement of the illumination device underneath the glass support, that is, without a corresponding layer of air, is detrimental because in that case the required homogeneous light distribution will not be achieved so that the resetting of the photosensor arrangement and also of the scintillator or converter layer is not effective. The glass support, serving notably for stabilizing the photosensor arrangement and the scintillator or converter layer carried by the support, cannot realize such a homogeneous light distribution. A further drawback of such a detector resides in its considerable height which is due to the presence of the glass support layer and the layer of air.

SUMMARY OF THE INVENTION

Therefore, it is an object of the invention to provide a radiation detector, an X-ray examination apparatus provided with a radiation detector, and a method of manufacturing a radiation detector which enable a small structural height of the radiation detector to be achieved while satisfying the same high reset requirements nevertheless.

This object is achieved by means of a radiation detector for the conversion of electromagnetic radiation into electric charges which includes at least one converter arrangement and an illumination device and a layer which supports at least the converter arrangement, the supporting layer realizing a spatially homogeneous distribution of the light emitted by the illumination device.

The invention is based on the idea that the functions of the glass support which supports the converter layers and the layer of air as known from the state of the art can be advantageously combined, yielding a significant reduction of the structural height in conjunction with further improvements and advantageous effects as will be described in detail hereinafter.

To this end, it is proposed to provide a supporting layer between the converter arrangement and the illumination device, which supporting layer on the one hand provides a homogeneous light distribution and on the other hand has adequate mechanical stability for stable accommodation and support of the converter arrangement provided on the supporting layer. The homogeneous light distribution is required for effective resetting of the converter arrangement and is realized by way of the layer of air in conformity with the state of the art. The homogeneous light distribution is achieved notably in that a layer of a synthetic material, for example, an acrylic layer, is provided between the converter arrangement and the illumination device. Such a layer has the necessary light absorption, thermal conductivity and also mechanical stability to support the converter arrangements provided over such a layer.

The illumination device emits the reset light notably in the direction of the overlying converter arrangement. In that case it is particularly effective to select a wavelength which lies in the sensitivity range of the converter arrangement. It is advantageous to choose light of a wavelength in the range of from 300 to 900 nm in such a case.

The supporting layer in a preferred embodiment of the invention is provided with cooling medium chambers which can receive a cooling liquid so that heat can be very effectively carried off in the radiation detector. A constant temperature in the radiation detector has a positive effect on the converter arrangement as well as on the electronic read-out circuitry. As the temperature is lower, for example, the sensitivity of the first converter layer increases, that is, notably when CsI:Ti is used as the scintillator material. A constant temperature enhances the stability of the dark images.

The illumination device in a further preferred embodiment of the invention is connected to a scatter foil so that the illumination device takes over the mechanical stability or the mechanical support of the converter arrangement provided thereon. This enables the construction of a radiation detector which is even flatter. The scatter foil serves to realize a homogeneous distribution of the reset light which is incident from below. In comparison with the state of the art, the foil enables the heat to be carried off even better in the flatter radiation detector, so that a water cooling system as required thus far can be dispensed with.

The acrylic layer or the scatter foil can be advantageously used to carry off the heat in the radiation detector by thermal conduction instead of thermal radiation, so that a cooling system as required thus far can operate more efficiently or can even be dispensed with completely.

Said acrylic layer in a particularly advantageous embodiment of the invention is molded directly together with the illumination device, so that the illumination device is connected to the supporting layer in a form-fit fashion.

The converter arrangement in a first embodiment includes two converter layers. The first converter layer is now formed by a scintillator arrangement. Said first converter layer converts the radiation incident thereon into visible light. Underneath the first converter layer there is arranged a second converter layer. The latter converter layer converts the visible light into electric charge carriers, for example, in a photosensor arrangement.

The converter arrangement in a further embodiment of the invention includes only a directly converting converter layer. This layer converts the X-rays into electric charge carriers which are read out via electrodes.

The photosensor arrangement is provided on a glass plate by means of a thin-film technique. In conformity with the state of the art such a glass plate would be bonded to the glass support arranged therebelow, thus necessitating the use of an additional adhesive layer could contain, for example, bubbles which attenuate the reset light from below or from the rear by as much as 10%. At the edges of the bubbles inhomogeneities occur, that is, so-called Newton rings, which obstruct the uniform resetting of the photosensor arrangement and also the spatially resolved measurement of the gain effect, or the non-linearity of the photosensors arranged thereabove, by means of the reset light.

A further advantage is achieved in that the vibrations of the glass plate are attenuated, for example, by the acrylic supporting layer in conjunction with the illumination device when the latter is mechanically pressed against the glass plate on which the photosensor arrangement is provided, thus mitigating microphony problems.

A directly converting layer of PbO or a scintillator arrangement of CsI:Ti can be vapor deposited on the glass plate with the sensors or electrodes provided by means of the thin-film technique.

In an advantageous embodiment an acrylic glass plate of a thickness of approximately 4 mm is arranged on the rear of the glass plate of a thickness of approximately 1 mm and provided with the photosensor arrangement, which acrylic glass plate is mechanically pressed against the glass plate with the photosensor arrangement by the illumination device.

The illumination device in a further advantageous embodiment of the invention is pressed into a liquid acrylic mass directly after the mounting of, for example, LEDs, so that the illumination device is connected to the supporting layer so as to be directly coupled and has a plane surface. Consequently, optical losses otherwise incurred because of the presence of an additional intermediate layer between the illumination device and the supporting layer are avoided. The plane surface is mechanically pressed against the converter arrangement.

It is advantageous to add, for example, titanium dioxide powder of a suitable concentration to the supporting layer in both cases described above, so that the distribution of the light emitted by the LEDs or the illumination device is spatially homogenized.

For improved dissipation of heat as well as attenuation of vibrations, the illumination device of this embodiment can again be immersed in an acrylic mass after the mounting of the components in order to ensure, by way of the plane surface, a large area of contact with the glass supporting plate with the photosensor arrangement. In that case, however, no additive will be required for light scattering.

The object is also achieved by means of an X-ray examination apparatus in which an X-ray detector in accordance with the invention is arranged so as to face an X-ray tube and the X-rays emitted by the X-ray tube traverse a patient or an object to be examined and are incident on the X-ray detector in accordance with the invention.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein.

DETAILED DESCRIPTION

Figure 1:
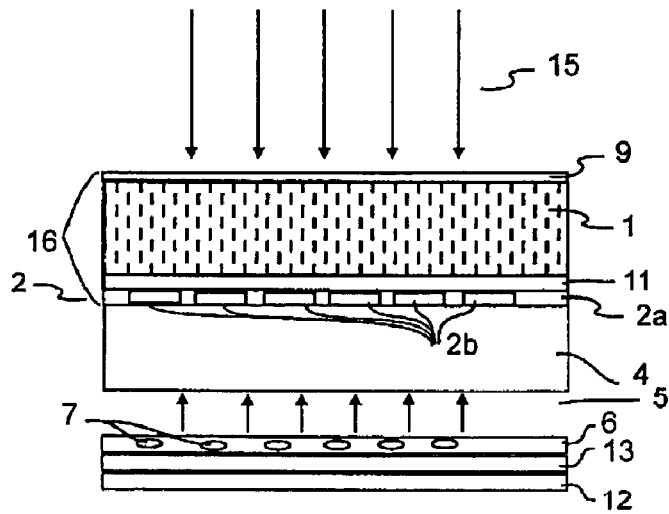
FIG. 1 is a diagrammatic representation of the construction of a contemporary flat dynamic X-ray detector.

FIG. 1 shows the construction of a radiation detector in conformity with the state of the art. The converter arrangement 16 thereof is formed essentially by a first converter layer 1 and a second converter layer 2. The converter layer 1 is connected, via an adhesive layer 11, to the glass plate 2a with the photosensor arrangement 2b provided thereon in the thin-film technique, for example, by amorphous silicon technology 11. Above the converter layer 1 there is provided a reflection layer 9 which reflects upwards reflected light back in the direction of the photosensor arrangement. The glass support 4 carries the glass plate 2a with the photosensor arrangement 2b provided thereon and the converter layer 1 arranged thereabove. Underneath the glass support 4 there is formed a layer of air 5 of a thickness of approximately 10 mm. The illumination device 6 with light-emitting diodes (LEDs) 7 is provided underneath said layer of air 5. The incident X-rays 15 pass the reflection layer 9 and are converted into visible light in the converter layer 1 which is constructed as a scintillator. The visible light is converted into electric charge carriers in the photosensor arrangement 2b, said charge carriers being applied to an electronic read-out circuit 12 which is arranged underneath the illumination device 6. The electronic read-out circuit is shielded from X-rays by a shielding layer 13.

Figure 2:
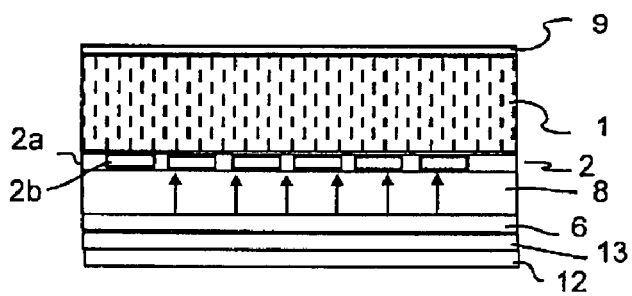
FIG. 2 shows a first embodiment of the X-ray detector in accordance with the invention.

In FIG. 2 the converter layer 1 is arranged over the glass plate 2a with the photosensor arrangement 2b. The glass plate 2a and the photosensor arrangement 2b constitute the converter layer 2. The two converter layers 1 and 2 are supported by a supporting layer 8 which is made of, for example, acrylic glass. Titanium dioxide is added to the acrylic glass. However, any other material suitable for achieving a homogeneous light distribution and a corresponding stability can be used. The illumination device 6 is arranged underneath the supporting layer 8.

For example, a semiconductor layer of CsI is vapor deposited on the pixels with the photosensors 2b and/or the capacitances for charge storage. The adhesive layer 11 between the first and the second converter layer 1, 2 can thus be dispensed with.

Figure 3:
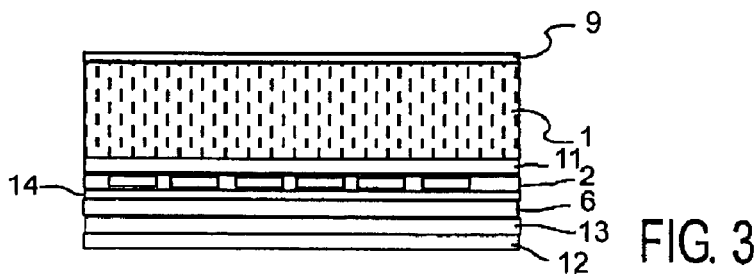
FIG. 3 shows a second embodiment of the X-ray detector in accordance with the invention.

FIG. 3 shows a further embodiment of the invention. The converter layer 1 therein is arranged over the glass plate 2a with the photosensor arrangement 2b. Underneath the glass plate 2a with the photosensor arrangement 2b there is provided a scatter foil 14 which is deposited directly on the surface of the illumination device 6. The stabilizing function is taken over by the illumination device 6 in this embodiment.

Figure 4:
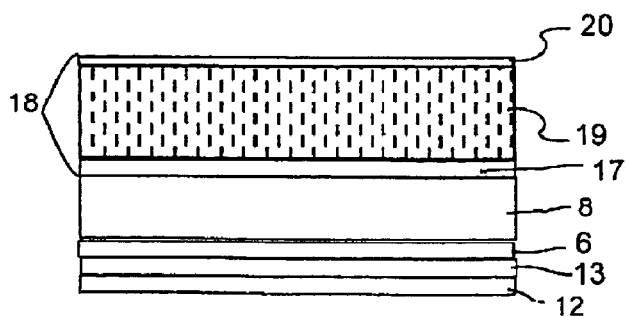
FIG. 4 shows the construction of a directly converting radiation detector.

FIG. 4 shows a radiation detector provided with a directly converting converter arrangement 18. This arrangement includes a converter layer 19, for example, of amorphous selenium or of PbO, a back electrode 20 and charge carrier sensors 17. The charge carrier sensors 17 include electrodes which store, by way of a capacitance, the charge carriers generated until they can be read out. The generating of the charge carriers in the converter layer 19 takes place in the electric field between the back electrode 20 and pixel electrodes (not shown) in the charge carrier sensors 17. The converter arrangement 18 is again arranged over the supporting layer 8 which itself is arranged over the illumination device 6. The supporting layer 8 ensures homogeneous distribution of the light emitted by the illumination device.

The FIGS. 2, 3, 4 clearly show that the radiation detector can be constructed so as to have a height which is significantly smaller than that which can be achieved in conformity with the state of the art as shown in FIG. 1.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

What is claimed is:

1. A radiation detector for converting electromagnetic radiation into electric charge carriers comprising:
    at least one converter arrangement;
    an illumination device, wherein the illumination device is located in the radiation detector; and
    a layer which supports at least the converter arrangement, the supporting layer realizing a spatially homogeneous distribution of the light emitted by the illumination device.

2. The radiation detector of claim 1 wherein the supporting layer is provided between the converter arrangement and the illumination device and the illumination device is arranged to emit light in the wavelength range of from 300 to 900 nm in the direction of the converter arrangement.

3. The radiation detector of claim 1 wherein the supporting layer comprises a material having at least one of a low light absorption and a high thermal conductivity and mechanical stability.

4. The radiation detector of claim 1 wherein that the supporting layer is connected to the illumination device in a form-fit fashion.

5. The radiation detector of claim 1 wherein the supporting layer is provided with cooling medium chambers containing a cooling medium in order to carry off heat.

6. The radiation detector of claim 1 wherein that the supporting layer contains TiO2.

7. A radiation detector for converting electromagnetic radiation into electric charge carriers comprising:
   a converter arrangement;
   an illumination device, the illumination device being located in the detector; and
   a scatter foil between the converter arrangement and the illumination device, the scatter foil acts as a distribution layer for the homogeneous distribution of light emitted by the illumination device, the illumination device supporting the converter arrangements arranged over the illumination device.

8. The radiation detector of claim 1 wherein the converter arrangement includes:
   a first converter layer for converting electromagnetic radiation into visible light, and
   a second converter layer for converting the visible light into electric charge carriers.

9. The radiation detector of claim 1 wherein the converter arrangement includes:
   a directly converting converter layer for converting X-rays into electric charge carriers,
   a back electrode,
   a charge carrier sensor with a read-out, and
   a storage component.

10. A radiation detector for converting x-rays into electric charge carriers, the detector comprising:
    a converter arrangement which includes one of:
      a first converter layer for converting electromagnetic radiation into visible light and a second converter layer for converting the visible light into the electric charge carriers; and
      a directly converting converter layer for converting the detected x-rays into electric charge carriers and a charge carrier sensor with a readout;
    a controllable light source optically coupled to the converter arrangement, the light source being controllable to supply light to reset the converter arrangement after receiving x-rays,
    wherein the converter arrangement has an X-ray receiving face and an oppositely disposed backside, the light source being optically coupled to the back side.

11. A radiation detector for converting x-rays into electric charge carriers, the detector comprising:
    a converter arrangement which includes one of:
      a first converter layer for converting electromagnetic radiation into visible light and a second converter layer for converting the visible light into the electric charge carriers; and
      a directly converting converter layer for converting the detected x-rays into electric charge carriers and a charge carrier sensor with a readout;
    a controllable light source optically coupled to the converter arrangement, the light source being controllable to supply light to reset the converter arrangement after receiving x-rays,
    wherein the converter arrangement includes at least one amorphous silicon layer formed on and supported by a light transmissive substrate, the light source being optically coupled to the light transmissive substrate.

12. An X-ray examination apparatus comprising:
    an X-ray source and
    one or more radiation detectors, wherein at least one radiation detector comprises:
      at least one converter arrangement;
      an illumination device, wherein the illumination device is located in said at least one radiation detector; and
      a layer which supports at least the converter arrangement, the supporting layer realizing a spatially homogeneous distribution of the light emitted by the illumination device.

13. The X-ray examination apparatus of claim 12 wherein the supporting layer comprises a material having at least one of a low light absorption and a high thermal conductivity and mechanical stability.

14. The X-ray examination apparatus of claim 12 wherein the supporting layer is provided with cooling medium chambers containing a cooling medium in order to carry off heat.

15. The X-ray examination apparatus of claim 12 wherein the converter arrangement includes:
    a first converter layer for converting electromagnetic radiation into visible light, and
    a second converter layer for converting the visible light into electric charge carriers.

16. The X-ray examination apparatus of claim 12 wherein the converter arrangement includes:
    a directly converting converter layer for converting X-rays into electric charge carriers,
    a back electrode,
    a charge carrier sensor with a read-out, and
    a storage component.

* * * * *